United States Patent Office 3,448,666
Patented June 10, 1969

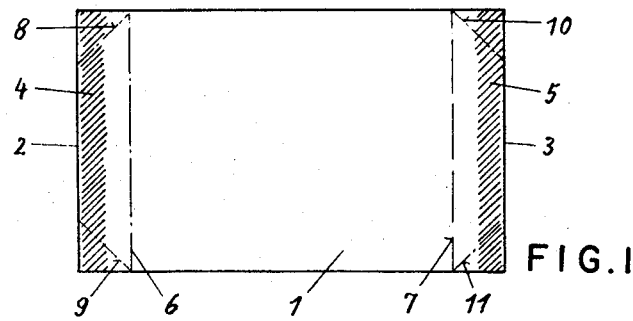
FIG.1
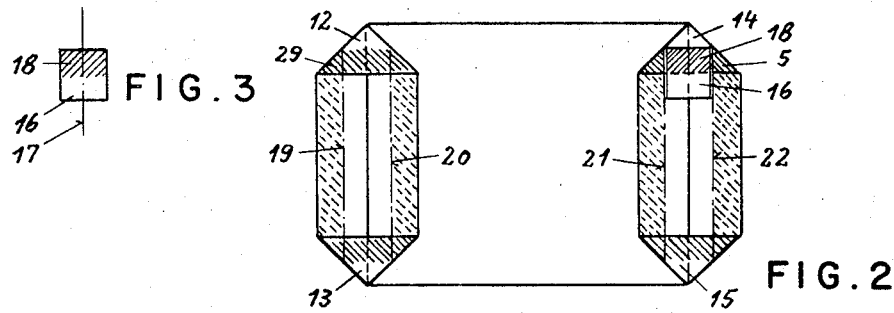
FIG.3
FIG.2
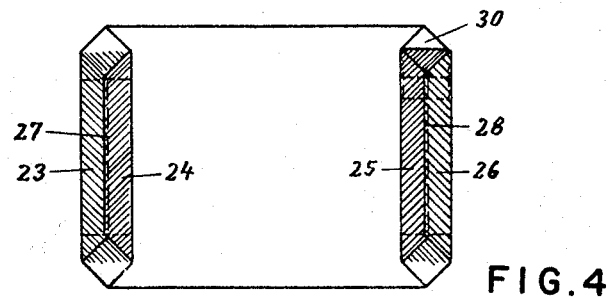
FIG.4
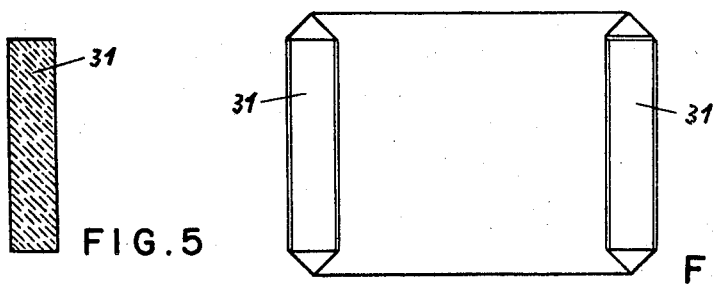
FIG.5
FIG.6

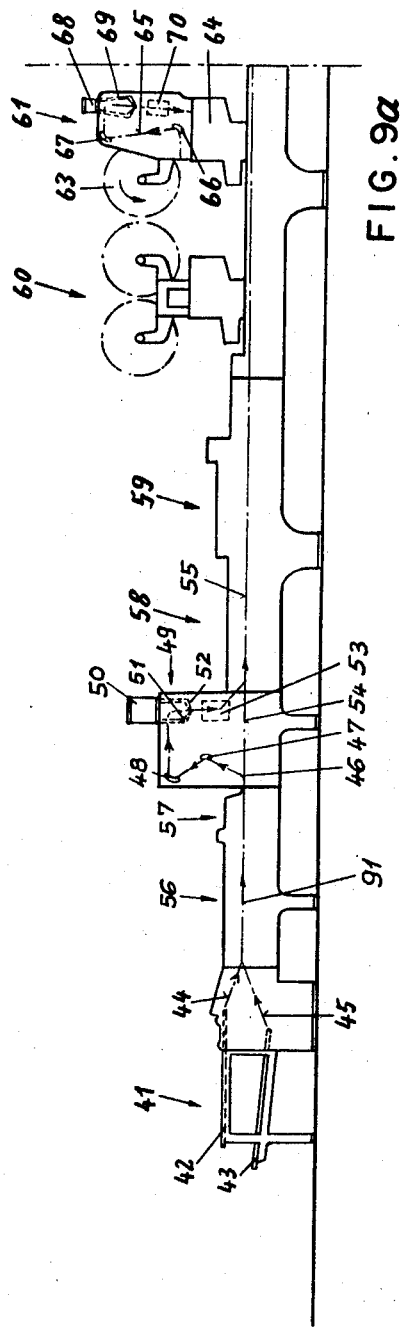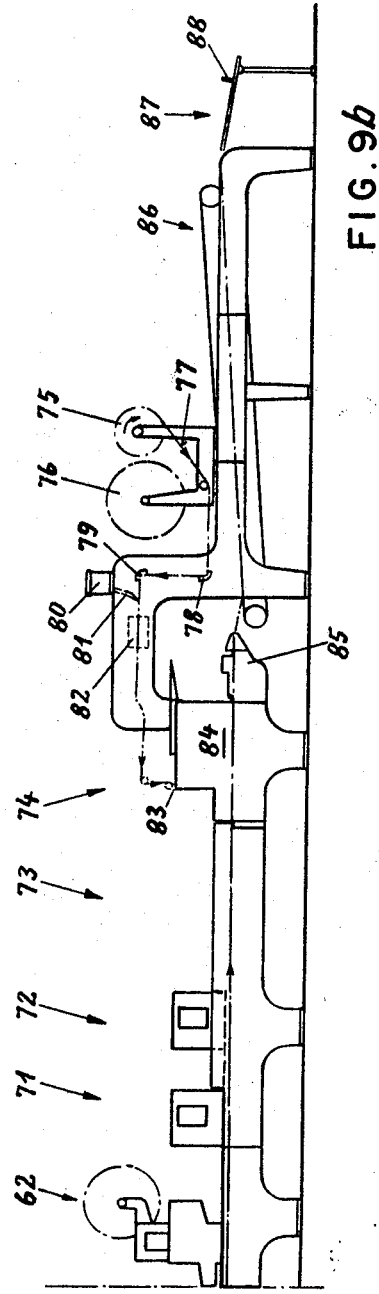

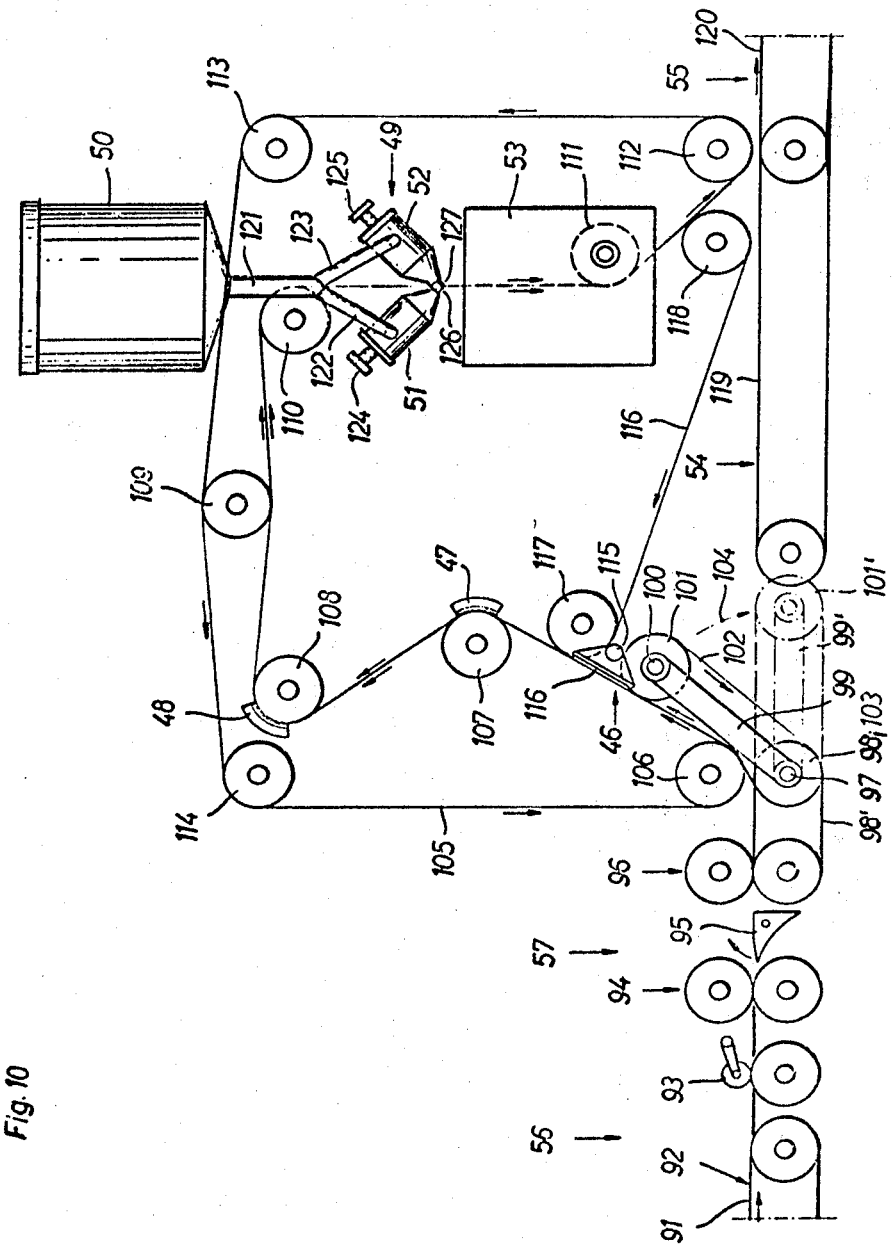

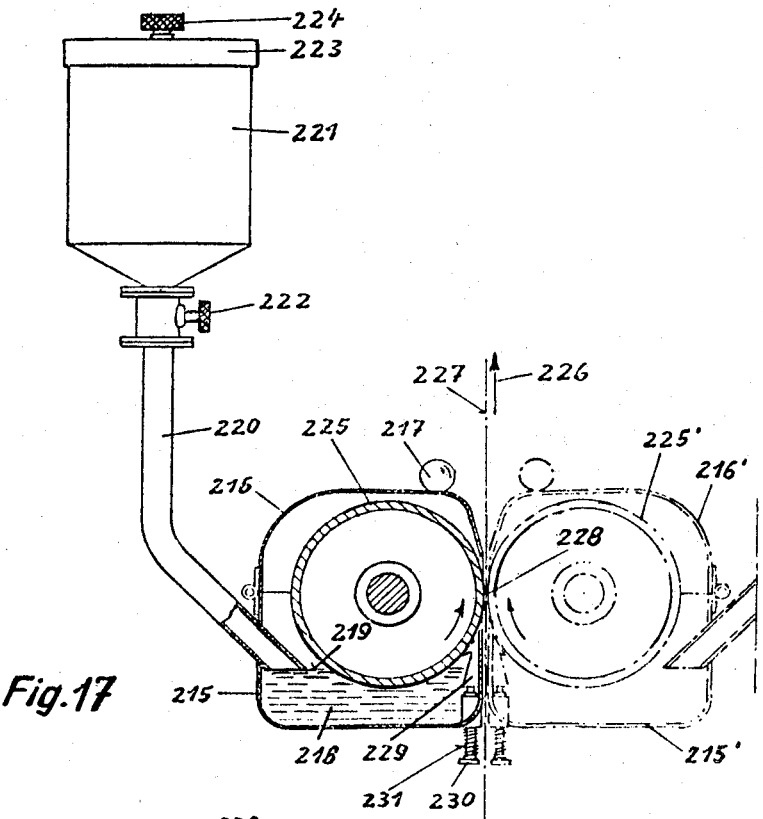
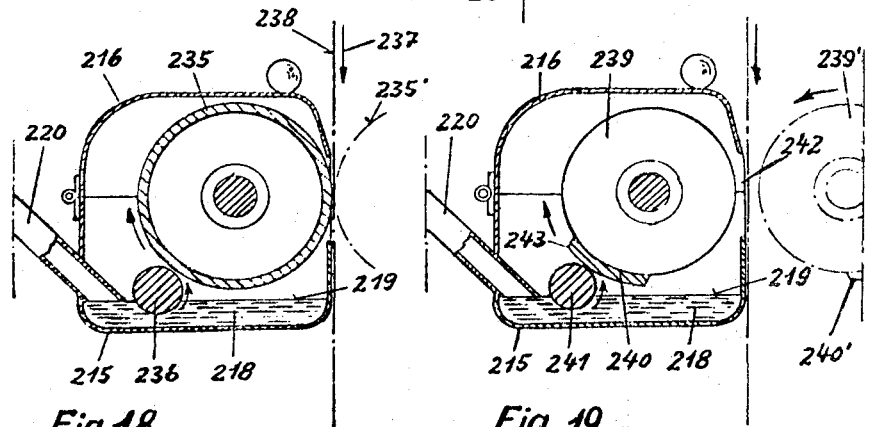
Fig.17
Fig.18
Fig.19

3,448,666
CROSS-BOTTOM SACK AND APPARATUS FOR MANUFACTURING SAME
Hermann Kappelhoff, Hamburg, and Max Georg Gunnerich, Walter Paul, and Walter Steinbeck, Lengerich, and Willy Niemeyer, Natrup-Hagen, Germany, assignors to Windmöller & Hölscher, Lengerich, Germany
Original application Apr. 2, 1964, Ser. No. 356,882, now Patent No. 3,313,217, dated Apr. 11, 1967. Divided and this application Oct. 10, 1966, Ser. No. 604,495
Claims priority, application Germany, Apr. 11, 1963, W 34,295
Int. Cl. B31d 1/02; B05c 3/02; B05b 5/00
U.S. Cl. 93—8        23 Claims This is a division of application Ser. No. 356,882, filed Apr. 2, 1964, now Patent No. 3,313,217, issued Apr. 11, 1967.

In the previously known processes of making adhered crossed-bottom sacks, the open bottom is first laid by a bottom-laying machine then the adhesive is applied in the proper size to the open bottom and, if desired, to a valve, an inner patch and/or a bottom covering sheet, and finally the bottom elements are adhered together. This practice requires adhesive applicators which are sometimes rather complicated, and involves the disadvantage that the adhesive must be applied in the bottom-laying machine. Whereas the conventional adhesives can be relatively easily removed when they have dried, more recent adhesives have the inconvenient property of drying very firmly onto the machine elements so that the machine may become blocked very soon. Besides, more recent adhesives for plastic sheeting contain solvents which are so volatile that they cannot be applied by the usual adhesive applicators comprising an immersed roll, a transfer roll and an applicator roll, because the solvent is evaporated too rapidly.

A process of manufacturing crossed-bottom sacks, particularly from plastics materials, is characterized according to the invention in that the tube lengths are provided on the outside, along the edges of their open ends, before the bottom is folded, with an adhesive which is effective in a dry or almost dry condition, this adhesive is applied in a width which corresponds to the width of the bottom side flaps to be subsequently formed, the solvent is substantially evaporated, the bottom is then pulled open and folded, and the surfaces to be adhered to each other are forced together. Hence, the adhesive is applied in the process of the invention before the bottom is folded so that very simple adhesive applicators may be used because it is only necessary to apply adhesive to a strip which extends along the edges and has a width corresponding to the width of the bottom side flaps to be subsequently formed. As the bottom side flaps are adhered when the applied adhesive is dry or almost dry, the adhesive applicators need not be arranged within the bottom-laying machine. All means using liquid adhesive may be arranged before the devices serving to pull open and lay the bottom so that the bottom-laying machine cannot be smeared with adhesive.

In a development of the invention, an adhesive may be used which adheres only to itself, and the bottom side flaps of the crossed bottom may have an adhesive-coated bottom covering sheet adhered to them. As only the outside surfaces of the bottom side flaps are coated with adhesive, the bottom covering sheet, which must be coated with adhesive on the inside, is required and sufficient for adhering the bottom.

In a process of manufacturing sacks from polyolefins, the invention teaches to subject the tube lengths to a surface-activating pretreatment, particularly by electrostatic discharges, before the adhesive is applied, and to use an adhesive which forms cross-links with the activated polyolefin surfaces. The manufacture of sacks from polyolefins is known to involve special difficulties because the welding of polyolefin sheeting results in a weakening of the material at the seam weld so that the inherent static and dynamic strengths of the sheeting are not achieved, and because it is extremely difficult to use machines for the formation of the various seam welds. Attempts to join the sheeting with the aid of so-called contact adhesives have also failed. The polyolefins being insoluble, a positive bond cannot be formed by adhering and the adhesive bond has not found to be sufficiently durable when such sacks were stored in stacks. Besides, the most conventional contact adhesives contain water and solvent, which evaporate to cause the adhesive or adhesive combination proper to adhere. This evaporation is limited by the sheeting owing to its thickness and the resulting low permeability to vapor, particularly at those points of the sacks where several plies of the sheeting have been superimposed by folding the sack bottom.

In contrast to this, the above-mentioned development of the process according to the invention relies on the fact that the chain molecules at the surface are highly activated by a suitable pretreatment of the polyolefin surfaces. This treatment may be effected by an ozone-forming electrostatic discharge or, e.g., by the action of a lean gas flame, or of chromic acid, permanganate or the like. The resulting oxygen-containing groups, which are highly unstable and not permanent, must be reacted, possibly during the same operation, with suitable, highly active chemical substances to effect cross-linking between the activated polyolefins and these agents.

In a further development of the invention, the adhesive may consist of a solvent-dissolved mixture of isocyanate-modified polyesters having free hydroxyl groups, and isocyanate resins. It is suitable to use the isocyanate resins in excess of the stoichiometric amount relative to the polyesters in order to promote the bonding of the isocyanates to the polyolefine molecules. In spite of the fact that the surface of the coating is almost non-tacky, the coatings tend to form such a strong adhesive bond when forced together that the sheeting layers can be separated only with destruction of the coating. It must be assumed that the highly polar and reactive isocyanate groups react with the free hydroxyl groups of the polyesters in the adhesive layers and form principal valency bonds with the polyolefin structure with the aid of the oxidised layer formed by the above-mentioned activating process so that a substantially positive bond can be expected.

Although the adhesive may alternatively consist of an epoxy resin which is dissolved in a solvent, the mixture which has been described hereinbefore of isocyanate resins and isocyanate-modified polyesters having free hydroxyl groups has much better adhesive properties.

In order to match the properties, such as the elasticity and ductility, of the cured adhesive layer with those of the sheeting, and to improve the shock resistance, resistance to delamination, and shear strength, suitable modifiers may be added to the adhesive. Substances which are suitable for this purpose include, e.g., polyisobutylene, polyvinylether, polyvinylcarbazole, chlorinated rubber, interpolymers, chlorinated or sulfo-chlorinated polyolefins and the like. It may also be suitable to add accelerators to the solution.

A sack which has been made by the process described hereinbefore, particularly from a polyolefin, may be characterized according to the invention in that the outside surfaces of the bottom side flaps of each sack bottom are adhered to an adhesive-coated bottom covering sheet. As the adhesives primarily contemplated for use in the process according to the invention adhere only to themselves rather than to uncoated layers of plastics material, it would be suitable to arrange the bottom side flaps exactly in abutting relation. Such an exact work is not possible, however, and a gap would leave a weak point in the bottom. For this reason, a development of the invention resides in that the bottom side flaps overlap each other only in a narrow area. Alternatively, the bottom side flaps may overlap each other in a wide area and the outer bottom side flap may have apertures of substantial area, through which the adhesive bond between the outside surface of the inner bottom side flap and the bottom covering sheet is formed. A valve tube coated with adhesive on both sides may be adhered between one of the infolded corner portions and the bottom covering sheet.

An apparatus for manufacturing the sacks according to the invention is characterized by an adhesive applying and drying station preceding a known bottom-making machine.

The bottom-making machine is suitably arranged for transverse feeding and the adhesive applying station comprises applicators which coat adhesive on both sides of each end portion of each tube length. For carrying out the process proposed according to the invention particularly for adhering polyolefin sacks, devices for activating the tube length surfaces, preferably devices for producing electrostatic discharges may precede the applicators in the feed direction. These activating devices remain inoperative when other materials are processed, the surface of which need not be pretreated. The same is true when polyolefin sheeting has been pretreated immediately after its extrusion so that a further pretreatment is not required. It is particularly suitable if the activating devices are preceded by devices for heating the sheeting because the optimum effectiveness of the pretreatment will be achieved when the latter is carried out at a temperature of about 40° C.

The apparatus which has been described hereinbefore may be further characterized by pairs of conveyor belts, which grip the tube lengths while leaving free the edge portions to be coated, and move the tube lengths past the activating, applicator and drying devices. At least adjacent to the adhesive applicators, the pairs of conveyor belts may extend in a vertical direction for saving a maximum of space.

Each conveyor belt may have associated with it a revolving gripper chain, which extends parallel to the belt and serves to prevent a slipping of the tube blanks between the pairs of conveyor belts. The pairs of conveyor belts may be preceded by a known aligning station and preferably by a known deflector for eliminating skewed or doubled workpieces.

The adhesive applying station comprises preferably two opposed adhesive applicator tools, which are self-sealing and arranged to be opened under the control of the tube blanks. A particularly simple adhesive applicator will be obtained if each adhesive applicator tool is provided with a sealing member, which seals an adhesive reservoir in position of rest and is movable by the tube blanks to an open position against the action of resilient means, the sealing members of opposed applicator tools being closely spaced apart or contacting each other without pressure. The sealing members may consist of rubber lips which cooperate with metal strip members, or of rolls, which are yieldably held by holding wires in lateral openings of the adhesive reservoirs. In another embodiment the adhesive applicator tools consist of pivoted wide slot nozzles, which seal each other and the pivoted arms of which carry control discs, which contact each other at their peripheries and are rotatably mounted in such a manner that their line of contact lies closely before the openings of the wide slot nozzles in the feed direction of the blanks. As a result of the arrangement of the control discs, a tube blank entering the adhesive applicator will move the wide slot nozzles to their operative position shortly before the blank enters the region of the wide slot nozzles. The cross-section of flow of the wide slot nozzles may be adjustable by screw-threadedly adjustable cone members.

In another embodiment of the adhesive applicator, the adhesive applicator tools may comprise applicator rolls having a variable nip and rotatably mounted before openings of the adhesive containers, said rolls and the adhesive containers being connected to pivoted arms, which are urged toward each other by resilient means, and an adjustable stop being arranged to maintain between the applicator rolls a nip which is smaller than the thickness of the blank. Further embodiments are characterized in that each adhesive applicator tool comprises a housing, which is formed with a narrow, lateral slot and in which an applicator roll is rotatably mounted, which has an applying surface extending partly through the slot, and in which housing a constant adhesive level is maintained, said housings being spring-urged toward each other. A portion of the peripheral surface of the applicator roll may be immersed in the adhesive and the applicator rolls may co-operate with strippers. Alternatively, the applicator rolls may co-operate with pick-up rolls, which are immersed in the adhesive. In a particularly suitable arrangement, the adhesive closes a supply pipe, which leads to an adhesive supply container, which is disposed over the housing and sealed against an ingress of air. In this case the adhesive can flow by gravity only when the adhesive level in the housing exposes the opening of the supply pipe. As soon as the adhesive has reached the desired level, it seals the supply pipe so that the flow of adhesive is prevented because the adhesive supply container is air-tight.

In each of the adhesive applicators which have been described hereinbefore, one adhesive applicator tool may be replaced by a back-pressure tool if only one side of the blank is to be coated with adhesive. This applies, e.g., to the bottom covering sheets to be applied according to the invention or when an adhesive is used which adheres in a dry or almost dry condition to paper or plastics material so that a bottom covering sheet is not required for adhering.

Instead of the adhesive applicator tools which directly contact the blank surfaces to be coated, adhesive spray guns may be provided for coating the workpiece on each side on which this is desired.

In a particularly advantageous, further development of the invention, the blanks may be selectively fed to the activating, adhesive applicator, and drying devices or directly to the processing stations of the bottom-making maching. This enables the use of the bottom-making machine in the conventional manner for the manufacture of paper sacks, provided that the machine is equipped with the required devices for applying adhesive and the like, as well as in the manufacture of the sacks from plastics material in accordance with the invention.

The invention will be explained more fully in the subsequent description with reference to embodiments of the sack according to the invention and of the apparatus for manufacturing the same. These embodiments are shown by way of example in the accompanying drawing, in which:

FIG. 1 shows a flat-lying tube length, which consists of plastics material and is provided with dried adhesive.

FIG. 2 shows the tube length of plastics material as shown in FIG. 1 with the tube ends folded to form open crossed bottoms and with an adhered tubular valve patch.

FIG. 3 shows the tubular valve patch of FIG. 2 provided with dried adhesive.

FIG. 4 shows the tube length of plastics material of FIGS. 1 and 2 with bottom side flaps folded together.

FIG. 5 shows a bottom covering sheet provided on one side with a dried adhesive coating.

FIG. 6 shows the sack blank of FIG. 4 with bottom covering sheets of FIG. 5, which have been adhered onto the crossed bottoms.

FIGS. 9a and 9b are a diagrammatic side view showing a known bottom-making machine which has been improved according to the invention and is suitable for use in the manufacture of the sack according to the invention.

FIG. 10 is an enlarged view showing the first part of the machine of FIG. 9a.

FIGS. 11 to 19 show various embodiments of adhesive applicators.

Figure 7:
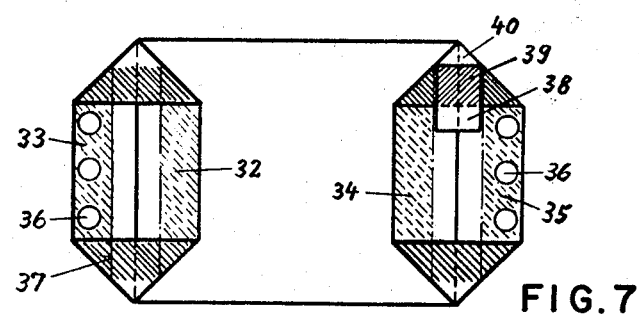
FIG. 7 is a view similar to FIG. 2 and shows a tube length of plastics material according to another embodiment of the invention.

The tube length 1 of thermoplastic material, preferably of polyolefins, is pretreated at its two open ends 2 and 3 on both sides in known manner for surface activation in an area which, for the sake of precaution, extends somewhat beyond the hatched zones 4 and 5, and is provided on both sides in the hatched areas 4 and 5 with coatings of an adhesive which is effective in a dry or almost dry condition and from which the solvent has been evaporated. Hence, the adhesive coatings are dry and will adhere only to a similar adhesive coating. Then the tube end portions are folded open in a known manner along the intended fold lines 6 to 11 indicated in dash-dot lines in FIG. 1 to form open crossed bottoms as shown in FIG. 2 with infolded corner portions 12 to 15.

In the meantime, a tube length 16, also of thermoplastic material, particularly of polyolefins, has been formed preferably by severing from a starting tube which is moved in the longitudinal direction 17 of the tube and in areas spaced by the length of the tube lengths to be formed has been properly pretreated and provided with an adhesive coating 18, which has the same composition and the same width as the adhesive coatings 4 and 5.

To form a filling valve, the tube length 16 is then adhered by that portion of the adhesive coating 18 which is on the underside of the tube onto the adhesive coating 5 on the infolded corner portion 14 in the middle of the bottom in such a manner that that portion of the tube length which is not provided with adhesive protrudes inwardly.

The adhesive coatings 4 and 5 extend to the intended bottom fold lines 19 to 22, along which the bottom side flaps 23 to 26 are folded over toward the middle of the bottom, as is shown in FIG. 4. The sequence of the folding-over operations is not significant. It would be desirable to cause the bottom side flaps to abut exactly. As such an exact work is not practicable and a gap would form a weak point in the bottom, the dimensions are selected so that the bottom side flaps 23 to 26 just overlap in the intermediate areas 27 and 28, respectively. The triangular areas such as 29, FIG. 2, of the infolded corner portions are folded over together with the bottom side flaps and are adhered to the underlying, adhesive-coated surface of the infolded corner portions or, in the valved corner 30, to the adhesive coating 18 on the valve patch 16.

The bottom is completed by a bottom covering sheet 31, which is shown in FIG. 5 and has been pretreated and provided with the adhesive layer according to the invention at least on one side. One of these sheets is applied to each crossed bottom and adhered to it by the contact between the dry adhesive coatings on the bottom and on the covering sheet.

Figure 8:
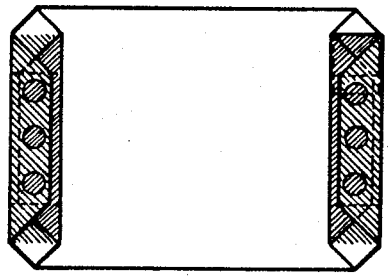
FIG. 8 shows the tube length of plastics material of FIG. 7 with bottom side flaps folded one over the other.

In the second embodiment shown in FIGS. 7 and 8, the dimensions are such that the bottom side flaps 32 to 35 overlap to a large extent, as is apparent from FIG. 8. The last bottom side flaps 33 and 35 which have been folded over are formed with relatively large holes, such as 36, through which the adhesive layer of the bottom side flaps 32 and 34 folded over first adheres to the bottom covering sheet, such as 31 (FIG. 5), which is also applied in this embodiment.

The adhesive coatings extend in this case also to the bottom fold lines 37. A valve patch 38 having an adhesive coating 39 of appropriate width is adhered in a similar manner into the valved corner 40.

It may be pointed out that in both embodiments the bottom side flaps do not adhere to each other in their overlap area because only one of the two contacting surfaces, namely, that of the bottom side flap to be folded over first, carries an adhesive coating, and this coating will not adhere to the other surface, which is not provided with adhesive.

With reference to FIGS. 9a, 9b and 10, it will be described hereinafter how a bottom-making machine known per se is modified according to the invention for the manufacture of sacks according to the invention.

A double feeder 41 comprises an upper feed table 42 and a lower feed table 43. Tube lengths of plastics material are alternatingly taken in an automatic manner from transverse blank stacks on these feed tables and transferred along the feed path 44 or 45 to the feed path 91, on which they pass first through a known aligning station 56. If two blanks are fed or if the skew of the blanks is too great for correction in the aligning station, a subsequently aranged deflector becomes operative to eliminate the work-pieces at 57. The tube lengths are then fed to another feed path 46, on which they pass through a first pretreating device 47 for one side of the tube and a second pretreating device for the other tube side. In each of these devices that area in which the tube end portions 2 and 3 are to be provided with adhesive is pretreated. When the tube lengths being processed have been separated from a freshly extruded tube web, which has been pretreated immediately after the extrusion for being printed upon, the pretreating devices 47 and 48, which produce preferably an ozone-forming electrostatic discharge, may be shut off. As any pretreatment which may have been effected after the extrusion will be maintained only for a certain time, tube lengths which have been stored in the meantime must be pretreated once more in the proper areas. For this purpose, the devices 47 and 48 are provided in the machine.

Sheeting which has not yet been pretreated at all is perferably heated, e.g., by infrared radiation, before the first pretreating station because the pretreatment is more effective when the sheeting is at elevated temperature. For this reason the known pretreatment of the sheeting in preparation of printing is effected after the extrusion, when the sheeting has still a temperature of about 40° C.

Adhesive coatings 4 and 5 are then applied to both sides of the end portions of the tube length at 49 by suitable adhesive applicators 51 and 52, which will be described hereinafter. Each of these applicators, which are fed from an adhesive containing 50, is associated with one side of the tube and consists suitably of two applicator units, each of which is associated with one end portion of the tube.

At 53, the tube lengths pass through a drying station, in which the solvent is evaporated so that the adhesive coatings are dried and can pass through the subsequent guiding and processing means of the machine without being damaged and without smearing the machine.

A feed path 54, which is normally provided in the machine and indicated in dash-dot lines, is used when the machine is employed for processing paper tube lengths in known manner whereas the stations which are additionally provide according to the invention and have been described hereinbefore are not utilized. The dried tube lengths are transferred to the normal feed path 55, which continues the feed paths 91 and 54 and on which they pass first through a grooving device 58 for pre-grooving the intended fold lines 6 to 11. The tube end portions are then folded over at the fold lines 6 and 7 and are folded open in the tube opening station 59 to form open crossed bottoms as shown in FIG. 2.

For universal utility in the provision of all conceivable types of valves in the manufacture of valved, crossed-bottom sacks of paper or of paper laminated with plastics material, the machine comprises three patch-inserting devices 60, 61, and 62. The station 62 comprises two patch-inserting units, which are disposed one beside the other on the two sides of the machine and serve for adhering an inner patch into the valve bottom and into the plain bottom. Of these patch-inserting devices, e.g., the patch-inserting device 61 is designed according to the invention for the preparation and insertion of the valve patch 16. A known feeding device, not shown, which is accommodated in part 64, serves to withdraw a continuous tube web from a supply roll 63 and along the path 65, which is indicated in dash-dot lines and provided with direction arrows, in succession past the pretreating stations 66 and 67 for both tube sides, through the intermittently operated adhesive applicator 69, which will be described more fully hereinafter and is fed from the adhesive container 68, and through the drying device 70. The part 64 contains a known cutting device and a known device for transferring the separated valve patches into the valve corners 14 of the tube blanks shown in FIG. 2.

The valve patch-inserting devices 60 and 62 and the subsequent stations 71 and 72 for applying adhesive for adhering the bottom side flaps of paper sacks remain inoperative when the process according to the invention is carried out.

The sack blanks as shown in FIG. 2 pass then through the device 73 for folding over the bottom side flaps 19 to 22 so that the condition shown in FIG. 4 is obtained.

In the condition shown in FIG. 4, the blanks reach the device 75 for applying the two bottom covering sheets 31 onto the two crossed bottoms. To prepare the bottom covering sheets, a web for each side of the machine is withdrawn, e.g., from a supply roll 75, which is preceded by a full roll 76 in order to enable a faster replacement of the rolls. The polyolefin web 77 withdrawn from each roll 75 is pretreated in the pretreating device 78 on the outside for subsequent printing and in the device 79 on the adhesive side. The device 79 is succeeded by the unilaterally arranged adhesive applicator 81, which is fed from the adhesive container 80, and by the drying device 82. The pretreated webs enter at 83 a known printing device as well as feeding, cutting and transfer devices, which are accommodated in the known part 84 of the machine. The transfer device forms the actual bottom covering sheet-applying station 74, in which the bottom covering sheets 31 are applied and adhered to the closed crossed bottoms.

A known device 85 for cutting through tube lengths closed at both ends by crossed bottoms to form two sacks which are open at one end and closed at the other may be used if no valve patch 16 is adhered and open polyolefin sacks are desired. The sacks are then fed in a partly overlapping arrangement on a delivery press 86, which is particularly required for drying the bottom adhesive apppplied in a wet condition to paper sacks. This extended delivery press is not required for the manufacture of polyolefin sacks adhered by the process according to the invention. The finished sacks arrive on a delivery table 87, on which the overlapping sacks are pushed together at the stop 88 to form a growing stacks of sacks.

FIG. 10 shows in an enlarged view the first part of the bottom-making machine modified according to the invention, as is shown in FIG. 9a, in the region of the feed paths 44, 45, 91, 46, 54, 55.

To align the tube lengths they are conveyed by belts along the feed path 91 against stops 92 secured to chains, which move at a lower speed. The tube lengths are then moved over a table plate to a sensing roller 93, which cooperates with an electric contact, and over another table plate to a pair of feed rolls 94. A tiltable deflector 95 follows, which is pivotally moved upwardly to eliminate skewed or doubled tube lengths. This movement is initiated by means of the electric contacts secured to the stops 92 and by means of the contacts on the sensing roller 93. Straight, single-lying tube lengths move over the deflector 95 in the position shown to a pair of feed rolls 96, the lower rolls of which are connected to further reversing rollers or pulleys 98 by belts 98'.

Levers are pivoted on the shaft 97 of the reversing pulleys 98 of the lowermost belts 98'. Another shaft 100 for belt pulleys 101 is mounted in the free ends of these levers. The belts 102 extend around belt pulleys 101 and corresponding further belt pulleys 103 on the shaft 97 and serve for selectively feeding the tube lengths along the rising feed path 46 in the case of polyolefin tube lengths or along the horizontal feed path 54 in the case of paper tube lengths. For this purpose, the levers 99 may be pivotally moved in the direction of the arrow 104 and in the opposite direction from the position shown in solid lines to the position shown in dash-dot lines at 99', 101'. The means for effecting this pivotal movement are not shown in detail. In their raised position, the belts 102 cooperate with further belts 105, which are guided by deflecting pulleys 106, 107, 108, 109, 110, 111, 112, 113, 109, and 114. When the tube lengths have been fed between the belts 102 and 105 from the deflecting pulleys 106 to the deflecting pulleys 101, their underside moves in sliding contact across a table 116, which is secured to a beam 115. Before the tube length leaves the deflecting pulleys 101, the tube length is gripped by further belts 116, which cooperate with the belts 105 and extend around deflecting pulleys 117, 107, 108, 109, 110, 111, and 113. Between belts 105 and 116, the tube sections are then fed to the pretreating devices 47 and 48, the station 49 for applying adhesive, and the station 53 for evaporating the solvent. These devices and stations have been generally described hereinbefore. Adjacent to the deflecting pulleys 112 and 118, the tube lengths reach conveyor belts 119, which form the feed paths 54 and 55 and feed the tube lengths in the direction of the arrow 120 to the growing device 58 for pre-grooving the intended fold lines 6 to 11, and to the further stations described hereinbefore.

To prevent a slipping of the smooth polyolefin tube lengths between the belts 116 and 105, it is suggested to arrange two additional gripper chains, which are parallel to the belts 116 and control the movement of the tube lengths by gripping them at their front ends.

Each of the pretreating stations 47 and 48 is disposed opposite to one of the deflecting pulleys 107 and 108. These stations are only diagrammatically indicated because devices for pretreating webs of plastics materials, particularly of polyolefins, are known per se.

In the embodiment shown in FIG. 10, the adhesive applicator 49 comprises two containers 51 and 52, the width of which at right angles to the plane of the drawing corresponds to the largest width in which the adhesive coatings 4 and 5 are to be formed. One adhesive supply container 50 together with adhesive containers 51 and 52 is disposed on each side of the machine and is connected to the containers 51 and 52 by adhesive conduits 121, 122, and 123. The adhesive supply to the applicator nozzles 126 and 127 can be adjusted by means of the handwheels 124 and 125. Various embodiments of adhesive nozzles will be described more in detail hereinafter.

The drying device 53 comprises known infrared radiators and an exhaust device leading into the open for discharging the solvent vapors evolved by the heating and evaporation of the solvent.

Figure 11:
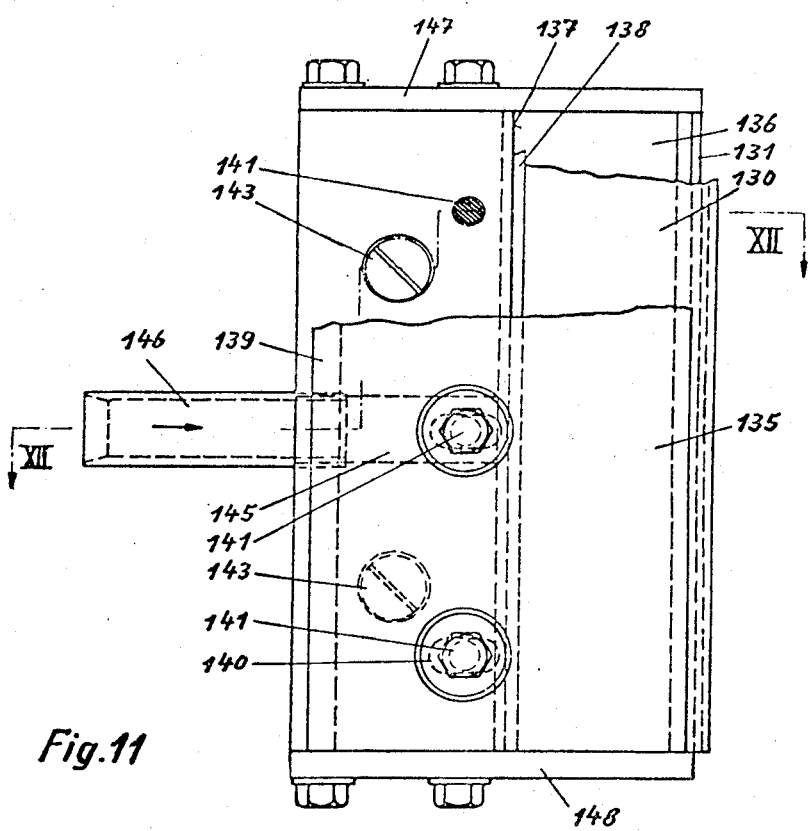
Figure 12:
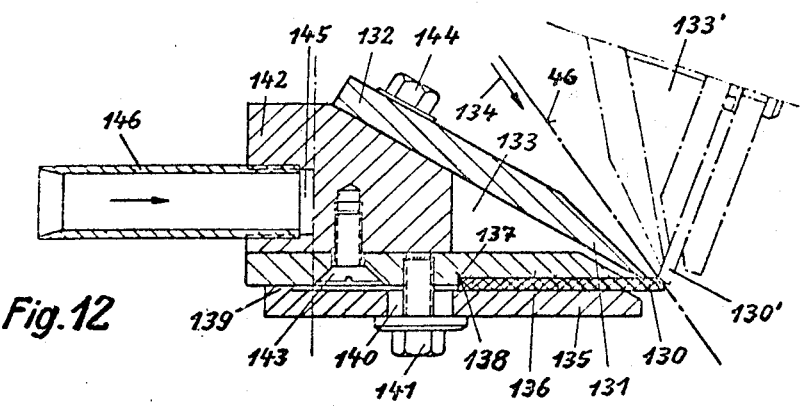

FIG. 11 is a top plan view showing an adhesive nozzle which may constitute, e.g., each of the adhesive nozzles 126 and 127 in FIG. 10. FIG. 12 is a sectional view taken on line XII—XII in FIG. 11.

The essential part of the nozzle is a rubber lip 130, which normally bears under a natural pressure against the sharpened portion 131 of a metal strip member 132 so that the adhesive which is in the interior cavity 133 under a static pressure does not emerge. When such devices are disposed on both sides of the path 46, which is indicated in dash-dot lines in FIG. 12 and on which the tube lengths are fed in the direction of the arrow 134, the spacing between these devices will be such that the rubber lips 130 and 130' are only very slightly spaced or contact each other only so gently that they do not bear upon each other so as to adversely affect the seal between the rubber lip and the sharpened portion of the metal strip member. On the other hand, the rubber lips 130 and 130' are so close to each other that they are deflected in the direction of movement of the tube lengths when the tube lengths enter between the lips with their end portions, which are to be provided with adhesive. This deflection eliminates the seal at the metal strip member so that adhesive emerges from the interior cavity 133 or 133' and flows over the rubber lip to the workpiece to wet the same. The overhang of the rubber lip beyond the metal strip member may be varied in dependence on the viscosity of the adhesive which is employed. For this purpose, the rubber lip is adjustably held between two plates 135 and 136. For an automatic alignment of the front edge of the lip, the metal plate 136 is provided with a step 137. A spacer 138 may be replaceably inserted between this step and the rubber lip to determine the overhang. The metal plate 135 has a raised rear edge 139 and is adjustably connected to the plate 136 by screws 141 extending through three slots 140. The metal plate 135 clamps the rubber lip 130 against the plate 136. The plate 136 and the strip member 132 are connected to a holding block 142 by means of screws 143 and 144, respectively.

The holding block 142 is formed with a transverse bore 145, which extends from the outside to the interior cavity 133. An adhesive supply pipe 146 is screw-threaded into the outer portion of this bore and communicates through additional pipes, not shown, with an elevated adhesive supply container.

The nozzle which has just been described may be connected to an adhesive container such as 51 in FIG. 10 so that the effective static pressure can be adjusted by means of the handwheel such as 124.

The interior cavity 133 is closed at both ends up to the rubber lip by end plates 147 and 148, which are screw-connected to the holding block 142.

The conveyor belts and the gripper on the conveyor chains grip the tube length in their intermediate portion, which is not to be provided with adhesive so that these belts and chains do not contact the adhesive nozzles.

The nozzle closes between successive tube lengths and opens when the next tube length enters. When an adhesive coating is desired only on one side, one nozzle is replaced, e.g., by a roll, which is disposed with the required small spacing from the rubber lip of the other nozzle.

Figure 13:
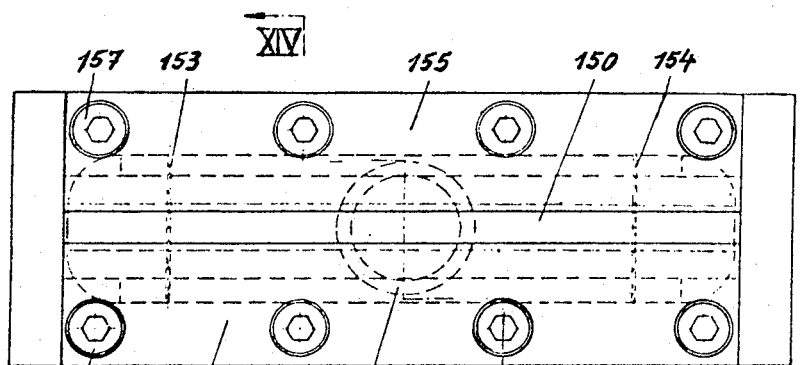
Figure 14:
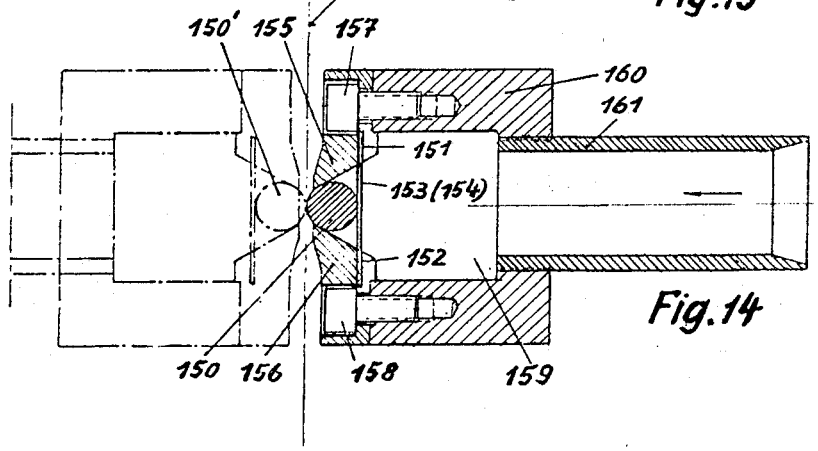

Another embodiment of a self-closing adhesive nozzle is shown in FIGS. 13 and 14. FIG. 13 is an elevation as seen from the side of the blank. FIG. 14 is a sectional view taken on line XIV—XIV of FIG. 13.

The essential feature of this nozzle is a roll 150, which is slightly urged against two jaws 155 and 156 by steel wires 153 and 154 slidably inserted in bores 151 and 152. In position of rest, the roll 150 and the backing roll 150' disposed on the other side of the tube path 46 are very closely spaced so that the blocking action which is due to the pressure exerted by the roll on the jaws under the action of the steel wires is not eliminated. On the other hand, the rolls are so close to each other that they are forced back by the intervening blanks so that the adhesive can emerge. The rolls are rotated as a result of their frictional contact with the blanks so that a good application of adhesive is ensured.

Each of the jaws 155 and 156 are screw-connected, e.g., by four screws 157 and 158, to a body 160, which defines an interior cavity 159. The jaws 155 and 156 form the bores 151 and 152, which receive the steel wires 153 and 154. The rear wall of the body 160 is provided with a bore, into which the adhesive supply pipe 161 is screw-threaded. The adhesive nozzle operates also with an adhesive, which is preferably under static pressure.

For an adhesive coating on one side, the roll 150', e.g., is replaced by any other rotatably mounted roll, which is preferably arranged at the same spacing from the roll 150 as the roll 150' in operative position.

Figure 15:
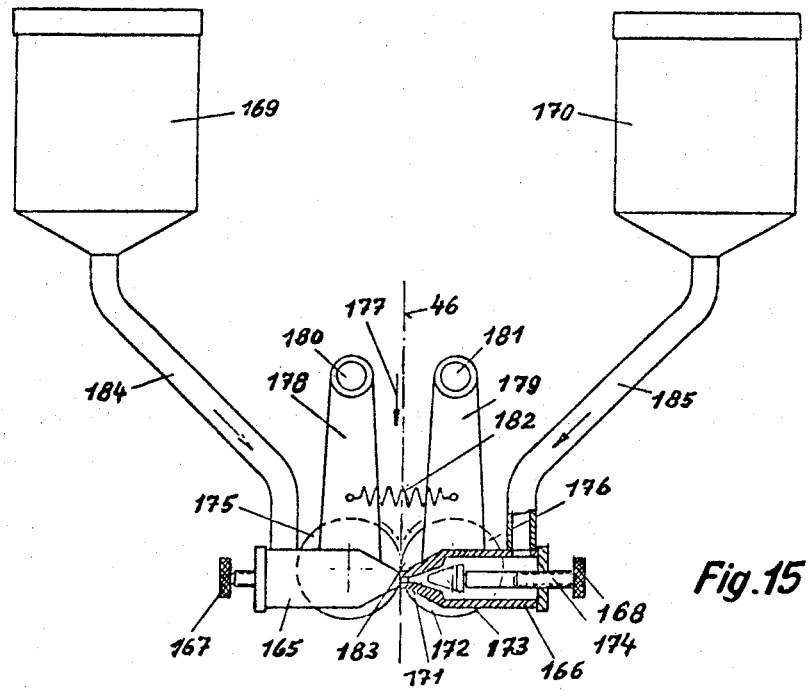

FIG. 15 is a side elevation showing another adhesive applicator, which is not self-sealing but is closed by the cooperating device disposed on the other side of the tube web or by a suitable cooperating member.

Two wide slot applicators 165 and 166 are disposed on opposite sides of the tube path 46. By means of a pair of handwheels 167 or 168, each of these devices can be blocked, or adjusted to the desired fraction of the static pressure established by the elevated adhesive supply containers 169 and 170. For this purpose, a hollow-conical opening 172 is disposed behind the extended outlet slot such as 171, and a suitable valve member 173 is adapted to be moved to a smaller or larger extent into this opening by means of the handwheels 168. The screws 174 are rotatably mounted in the valve member 173. A similar arrangement comprising a conical valve member has previously been proposed in connection with a circular nozzle opening.

Driven discs 175 and 176 are connected to the applicators 165 and 166 in such a manner that the point of contact of the disc is offset to some extent relative to the nozzles, such as 171, opposite to the direction of travel 177 of the blanks. This is apparent from FIG. 15, in which the center of each disc is indicated. The applicators and discs, respectively, are jointly secured to and mounted in levers 178 and 179, each of which is pivoted on a shaft 180 or 181 and is pulled toward the other lever by a tension spring 182. The levers 178 and 179 and with them the tension spring 182 are disposed at the outer end of the device beside the path of the blanks, which pass between the two springs 182 of the adhesive applicators disposed on both sides of the machine.

The rotating discs 175 and 176, which are offset opposite to the direction of travel of the workpieces, cause the adhesive applicators 165 and 166 to be moved apart by the thickness of the blank so that the leading edge of the tube lengths enters between the nozzles without contacting them and the tube lenghs are wetted by the emerging adhesive. When a tube section has passed through the applicator, the nozzles reengage to effect a natural seal. The position of the applicators 165 and 166 relative to their discs 175 and 176 is adjustable in the direction to the blanks. In this way, a certain pressure of the nozzle against the blanks can be adjusted by the provision of a larger or smaller distance between the discs when the nozzles are in sealing contact with each other so that the nozzles are not moved apart by the discs to the full extent of the thickness of the blank. The edges 183 at the receiving end are suitably rounded to avoid an engagement.

The adhesive supply conduits 184 and 185 are made from a yielding material to follow the engaging and disengaging movement.

When it is desired to use this device only for coating on one side, the applicator on the other side is rendered inoperative or, if there is always only a need for a coating on one side, one wide slot applicator 165 or 166 is replaced by a dummy, which serves only for closing the opposed nozzle.

Figure 16:
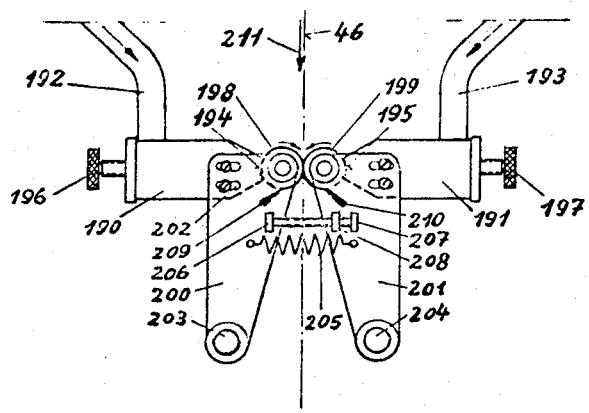

FIG. 16 is a side elevation showing a device which is similar to that shown in FIG. 15. In this device, however, the supply of adhesive to the point where the adhesive is applied is not blocked in the absence of a blank.

The adhesive containers 190 and 191 disposed on both sides of the blank feed path 46 are again supplied through adhesive conduits 192 and 193 from elevated adhesive supply containers and at their end facing the blank have an outlet opening 194 or 195. The flow of adhesive to their openings can be controlled by means of pairs of handwheels 196 and 197.

The special feature of this applicator resides in rotationally driven adhesive applicator rolls 198 and 191. The outlet openings 194 and 195 conform to the peripheral surface of these rolls. A gap between the roll surface and the walls defining the openings 194 and 195 is adjustable for carrying the adhesive film received by the rolls.

Each adhesive container 190 and 191 and the associated adhesive applicator roll 198 or 199 are adjustably mounted by means of slots 202 in a lever 200 or 201 to enable the nip between the rolls to be varied. Each lever 200 or 201 is pivoted on a shaft 203 or 204 and is pulled toward the other lever into a limiting position by a tension spring 205. This limiting position is determined by a stop 206 carried by the lever 200 and by a stop screw 207, which is screw-threaded in a tapped member 208 connected to the lever 201. In the limiting position, the adhesive applicator rolls 198 and 199 are so closely spaced apart that the adhesive film on the rolls can pass through the nip between the rolls and reach a doctor blade 209 or 210, by which it is stripped from the roll surface and discharged to a collecting container so that the roll surface will not be covered by an adhesive crust even when the conveyance of blanks is interrupted.

The nip between the rolls in the limiting position is smaller than the thickness of the blank so that blanks approaching on the feed path 46 in the direction of the arrow 211 force the devices apart against the force of the spring 205. The applicator rolls are now rolling under a certain, slight pressure on the surface of the blank to transfer the adhesive film onto the blank.

If this device is to be designed for applying adhesive only to one side, a backing roll is mounted in a fixed position at a distance corresponding approximately to one half of the thickness of the blank from the feed path 46. The tapped member 208 and the spring 205 are secured to stationary parts of the machine frame rather than to the lever 201.

FIGS. 17, 18 and 19 are sectional views, which show adhesive applicators, in which an adhesive is maintained on a certain level and a roll is immersed in this adhesive. A formation of a crust on the roll as a result of a premature escape of the solvent of the adhesive is prevented by a housing, which closely surrounds the whole structure and has only a narrow slot, through which the adhesive-wetted applying surface contacts the blank in an area which is as small as possible.

All three embodiments comprise essentially a housing 215, which is provided with a hinged cover 216 having a handle 217. In the lower part 218 of the housing, a body of adhesive is maintained on a certain level 219 because the adhesive itself blocks the adhesive supply pipe 220, the lower opening of which serves at the same time for admitting air to the airtight adhesive supply container 221 in replacement of the outflowing adhesive to prevent the formation of a vacuum. When the adhesive level 219 reaches the lower rim of the pipe 220, a further admission of air into the pipe 220 is blocked and the atmospheric pressure prevents a further emergence of adhesive. Hence, the adhesive level 219 is defined by the lower rim of the pipe 220. When it is desired to refill the supply container 221, the shut-off cock 222 is closed first. The supply container is airtightly closed by its cover 223. An airtightly sealing screw plug 224 is screwed out, and refilling is effected by means of a funnel. When the container has been filled, the screw plug 224 is inserted and tightened. Only thereafter is the shut-off cock 222 opened. Hence, air cannot be admitted to the surface of the adhesive in the supply container 221 or in the supply pipe 220. Such an admission of air would cause an inadmissible flow of the contents into the housing 215.

The embodiment shown in FIG. 17 comprises a rotationally driven adhesive applicator roll 225, which is immersed in the adhesive. The adhesive which is entrained by the surface of the roll is transferred onto the blank surface, which is moved past the roll in the plane 227 in the direction of the arrow 226. The housing 215, 216 has a narrow window 228.

A doctor 229 is provided for controlling the desired thickness of the adhesive film on the surface of the roll 225. The doctor 229 is adjustable by means of a screw 230, which is held against an unintended rotation by a spring 231 to maintain the screw in its adjusted position.

To form an adhesive coating on both sides, two such devices 215, 216 and 215' and 216' are arranged with mirror symmetry on opposite sides of the blank path 227 and are slightly resiliently connected to each other so that the blanks entering between the rolls 225 and 225' urge the devices slightly apart and the applicator rolls engage the blanks under slight pressure.

The embodiment of FIG. 18 comprises an applicator roll 235 and a stripping roll 236, which is driven at a lower peripheral speed lower than the applicator roll. In the embodiment shown in FIG. 19, the stripping roll 236 serves also as an immersed roll because only this roll is immersed in the adhesive and the film entrained by the roll 236 is transferred onto the applicator roll. The desired thickness of this film is controlled in the adjustable nip between the rolls 235 and 236.

In a modified embodiment, that part of the applicator roll 235 which is below the stripping point defined by the roll 236 is also immersed in the adhesive so that any adhesive which remains on the applicator roll owing to the intervals between the tube lengths is regenerated by contact with the fresh adhesive and its solvent.

With mirror symmetry to this device, a device comprising an applicator roll 235' may be arranged on the other side of the blanks moving in the plane 238 in the direction of the arrow 237.

The embodiment shown in FIG. 19 is specifically designed for producing striplike adhesive coatings 19 in intervals on the tube web, from which the tubular valve patches 16 are subsequently separated.

The rotating roll 239 carries an adhesive applying pad 240, the length of which, measured in the peripheral direction, corresponds to the width of the adhesive coating in the direction of travel. The stripping roll 241 cooperates with the adhesive applicator pad 240 in the manner which has been described for the embodiment of FIG. 18.

The adhesive applying pad 240 is as thin as possible or is countersunk in the peripheral surface of the roll 239 except for a small residual depth so that the window 242 in the housing 215, 216 is closed as far as possible by the roll 239 during the rotation of the applying pad inside the housing in order to prevent an ingress of air as far as possible and to obtain in the housing an atmosphere which is saturated with solvent vapor and opposes an evaporation of the solvent from the adhesive film.

In this embodiment, the adhesive applying pad 240 cannot and need not be immersed in the adhesive. An immersion is not possible because the leading edge 243 of the adhesive applying pad would entrain a larger amount of adhesive and this larger amount could not be eliminated by the stripping roll 241 and would result in irregular adhesive coatings. An immersion is not required because the tube web for the valve patches 16 moves continuously through the device and removes the adhesive from the adhesive applying pad during each rotation thereof.

If any of the adhesive applicators of FIGS. 17 to 19 is to be used for coating adhesive only on one side, the biasing applicator is replaced by a resiliently contacting backing roller, which is also driven.

All adhesive applicators which have been described hereinbefore are suitable for adhesives which contain a highly volatile solvent, particularly the adhesive according to the invention, which consists of isocyanate resins and isocyanate-modified polyester. For this reason these adhesives must be protected from an access of air during their transfer from a supply container to the point of application.

An entirely different applicator, which is known per se and has not been shown, consists of the known spray gun, which is generally used for the application of paint. The invention comprehends also the spraying of the adhesive by means of such spray guns onto the sack material surfaces to be coated. This mode of operation has the additional advantage that a large percentage of the solvent is evaporated between the nozzle and the sack material so that the adhesive coating is soon dry.

The embodiments of the invention in which an exclusive property or privilege is claimed are defined as follows:

1. In an apparatus for manufacturing sacks from tube lengths and including a bottom making machine, the improvement comprising means to apply adhesive to said tube lengths, and means to dry the applied adhesive, both of said means preceding said bottom making machine in the direction of travel of the tube lengths.

2. Apparatus as set forth in claim 1, characterized in that the bottom-making machine includes means for transverse feeding, and the adhesive applying means comprises applicators which coat adhesive on both sides of each end portion of each tube length.

3. Apparatus as defined in claim 2 characterized in that devices for activating the tube length surfaces precede the applicators in the feed direction.

4. Apparatus as defined in claim 3, characterized in that the activating devices are preceded by devices for heating the sheeting.

5. Apparatus as defined in claim 3, characterized by pairs of conveyor belts, which grip the tube lengths while leaving free the edge portions to be coated, and move the tube lengths past the activating, applicator and drying devices.

6. Apparatus as defined in claim 5, further comprising an aligning station for aligning the tube lengths, and a deflector for eliminating skewed or doubled tube lengths, said aligning station and said deflector preceding said pairs of conveyor belts in the direction of travel of the tube lengths.

7. Apparatus as defined in claim 5, characterized in that the pairs of conveyor belts extend in a vertical direction at least adjacent to the adhesive applicators.

8. Apparatus as defined in claim 5, characterized in that each conveyor belt has associated with it a revolving gripper chain, which extends parallel to the belt.

9. Apparatus as defined in claim 1, wherein the adhesive applying means comprise at least one applicator comprising, two opposed adhesive applicator means for applying adhesive to the tube lengths.

10. Apparatus as defined in claim 9, characterized in that the adhesive applicator tools are self-sealing and arranged to be opened under the control of the tube lengths.

11. Apparatus as defined in claim 10, characterized in that each adhesive applicator tool is provided with a sealing member, which seals an adhesive reservoir in position of rest and is movable by the tube lengths to an open position against the action of resilient means, the sealing members of opposed applicator tools being closely spaced apart or contacting each other without pressure.

12. Apparatus as defined in claim 11, characterized in that the sealing members consist of rubber lips, which cooperate with metal strip members.

13. Apparatus as defined in claim 11, characterized in that the sealing members consist of rolls, which are yieldably held by holding wires in lateral openings of the adhesive reservoirs.

14. Apparatus as defined in claim 10, characterized in that the adhesive applicator tools consist of pivoted wide slot nozzles, which seal each other and the pivoted arms of which carry control discs, which contact each other at their peripheries and are rotatably mounted in such a manner that their line of contact lies closely before the openings of the wide slot nozzles in the feed direction of the blanks.

15. Apparatus as defined in claim 14, characterized in that the cross-section of flow of the wide slot nozzles is adjustable by screw-threadedly adjustable cone members.

16. Apparatus as defined in claim 9, characterized in that the adhesive applicator tools comprise applicated rolls having a variable nip and rotatatably mounted before openings of the adhesive containers, said rolls and the adhesive containers being connected to pivoted arms, which are urged toward each other by resilient means, and an adjustable stop being arranged to maintain between the applicator rolls a nip which is smaller than the thickness of the blank.

17. Apparatus as defined in claim 9, characterized in that each adhesive applicator tool comprises a housing which is formed with a narrow, lateral slot, an applicator roll rotatably mounted in said slot with an applying surface extending partly through the slot, and means for maintaining a substantially constant level of adhesive in each housing, said housings being spring-urged toward each other.

18. Apparatus as defined in claim 17, characterized in that a portion of the peripheral surface of the applicator roll is immersed in the adhesive and the applicator rolls cooperate with strippers.

19. Apparatus as defined in claim 17, characterized in that the applicator rolls cooperate with pick-up rolls which are immersed in the adhesive.

20. Apparatus as defined in claim 17, further comprising an adhesive supply container disposed over the housing and sealed against an ingress of air, and a supply pipe leading from said supply container to said housing and having its discharge end positioned beneath the normal level of adhesive within said housing.

21. Apparatus as defined in claim 1, wherein the adhesive applying means include an applicator having means for applying adhesive to one side of a tube length, and back pressure means for contacting the other side of said tube length and cooperating with said applicator.

22. Apparatus as defined in claim 9, wherein said adhesive applicator means comprise adhesive spray guns for coating the tube lengths on each side.

23. Apparatus as defined in claim 3 further comprising means for selectively feeding tube lengths to the activating devices, adhesive applicators, and drying devices or directly to the processing stations of the bottom-making machine.

References Cited

UNITED STATES PATENTS 3,043,199   7/1962   Niemeyer _____ 93—22 X
3,272,093   9/1966   Brockmuller _____ 93—28 X BERNARD STICKNEY, Primary Examiner.

U.S. Cl. X.R.

118—3, 224, 411, 642; 229—57